A. LEHMANN.
MACHINE FOR TURNING IRREGULAR FORMS.
APPLICATION FILED MAY 27, 1909.
963,594.
Patented July 5, 1910.
7 SHEETS—SHEET 4.
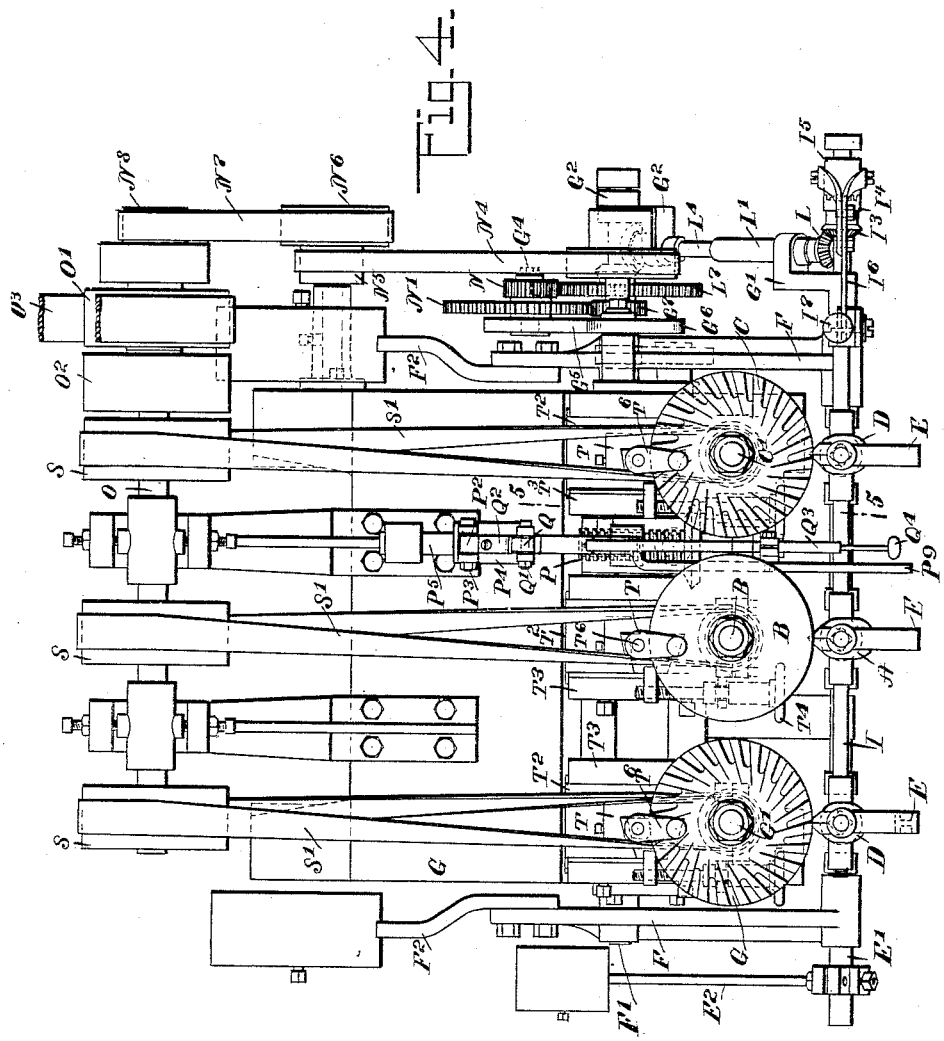
WITNESSES
INVENTOR
Adolf Lehmann
BY
ATTORNEYS

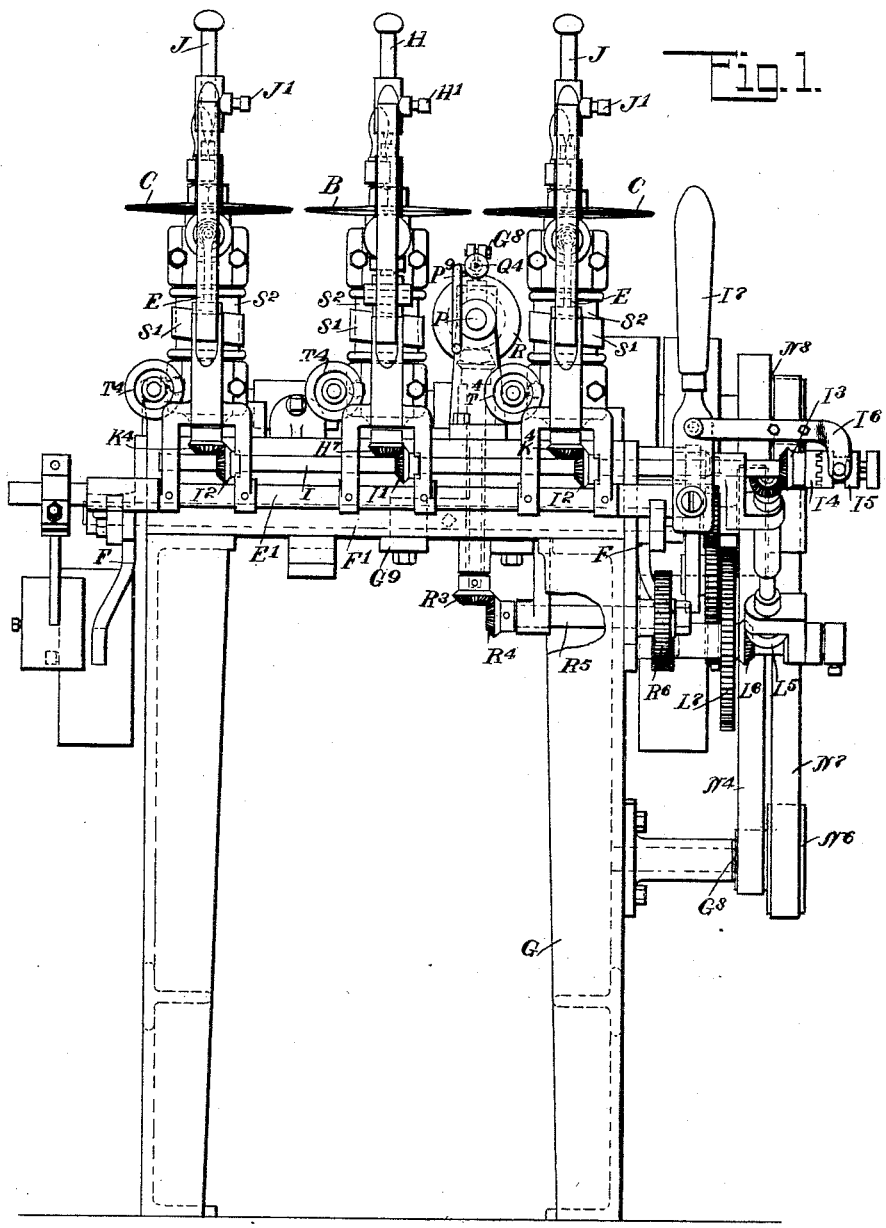

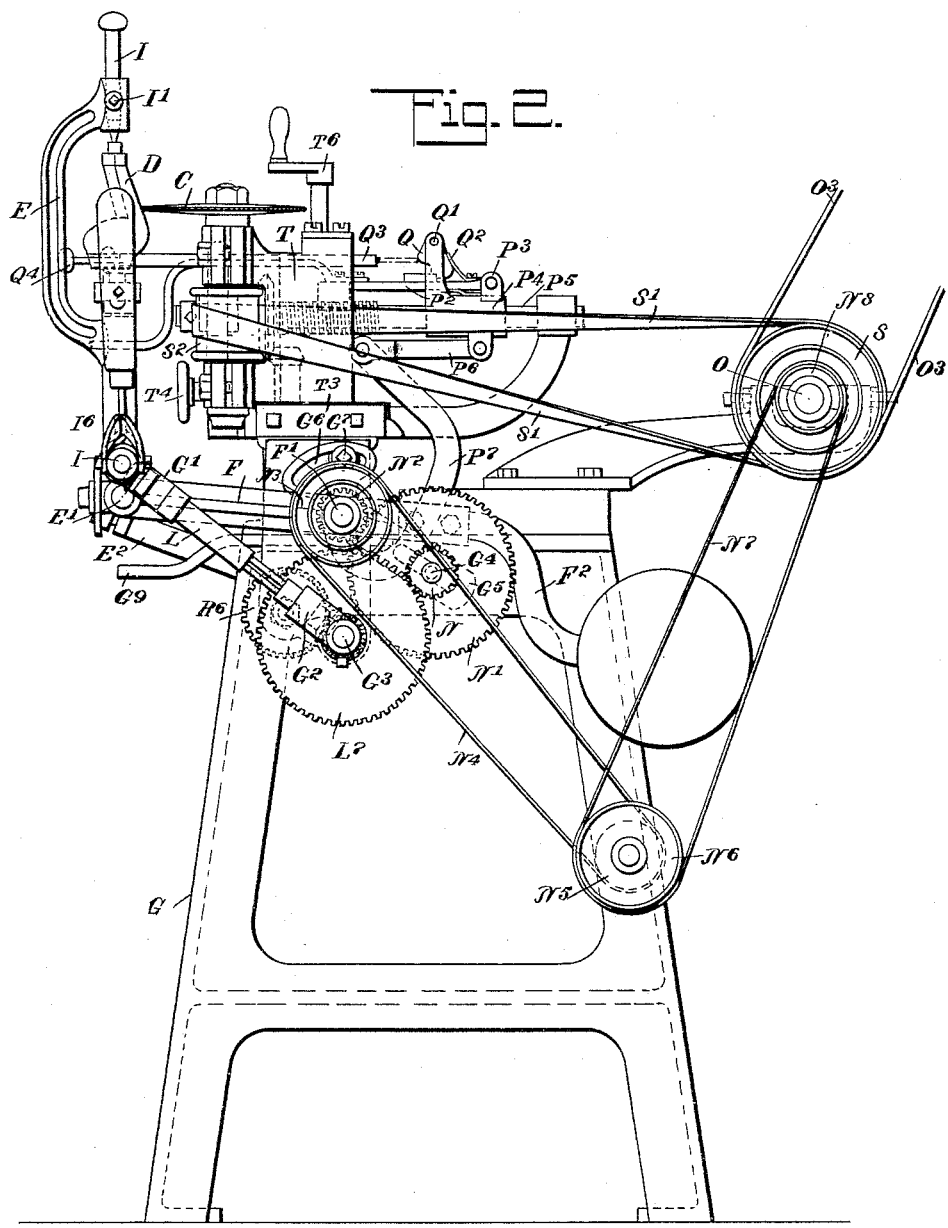

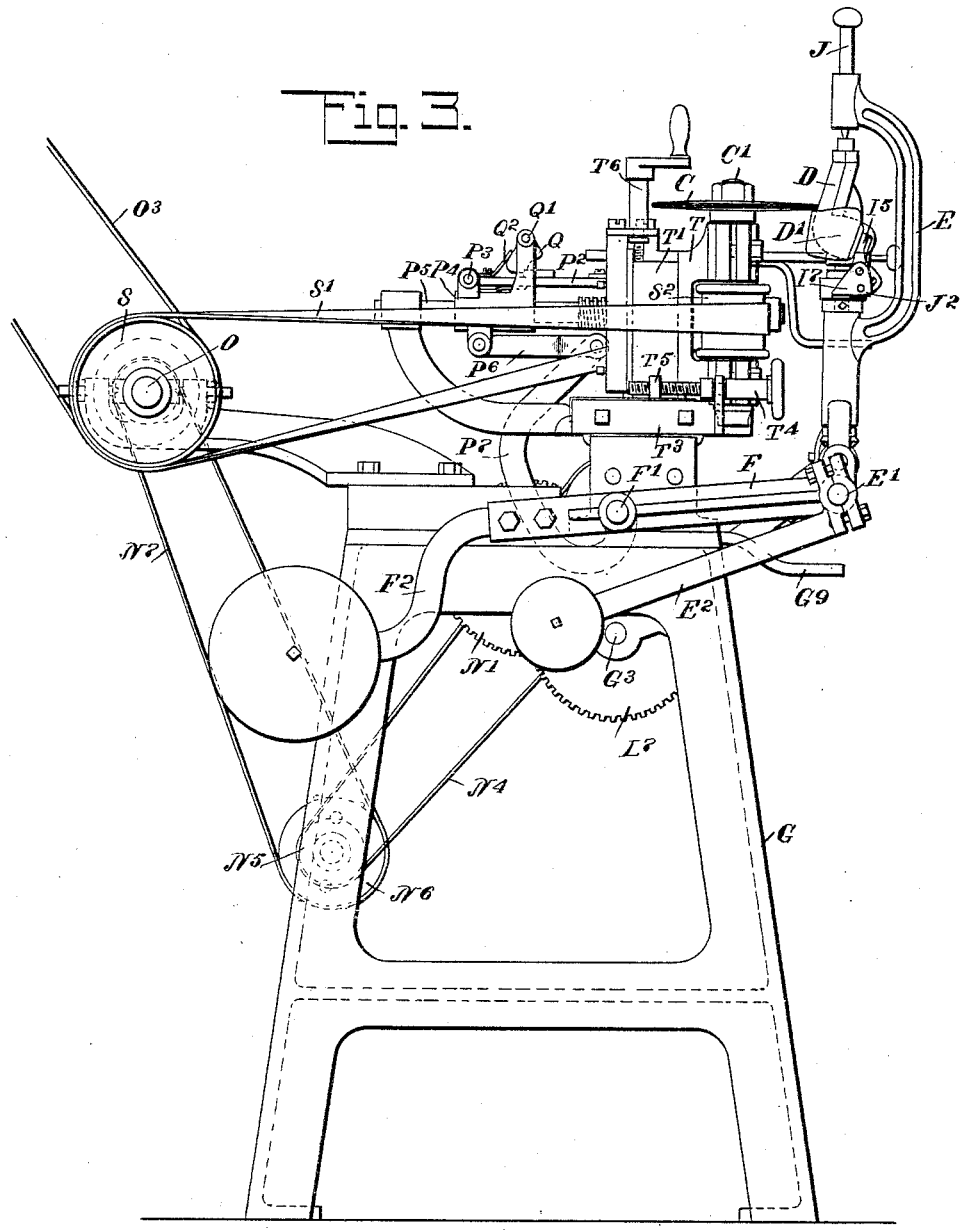

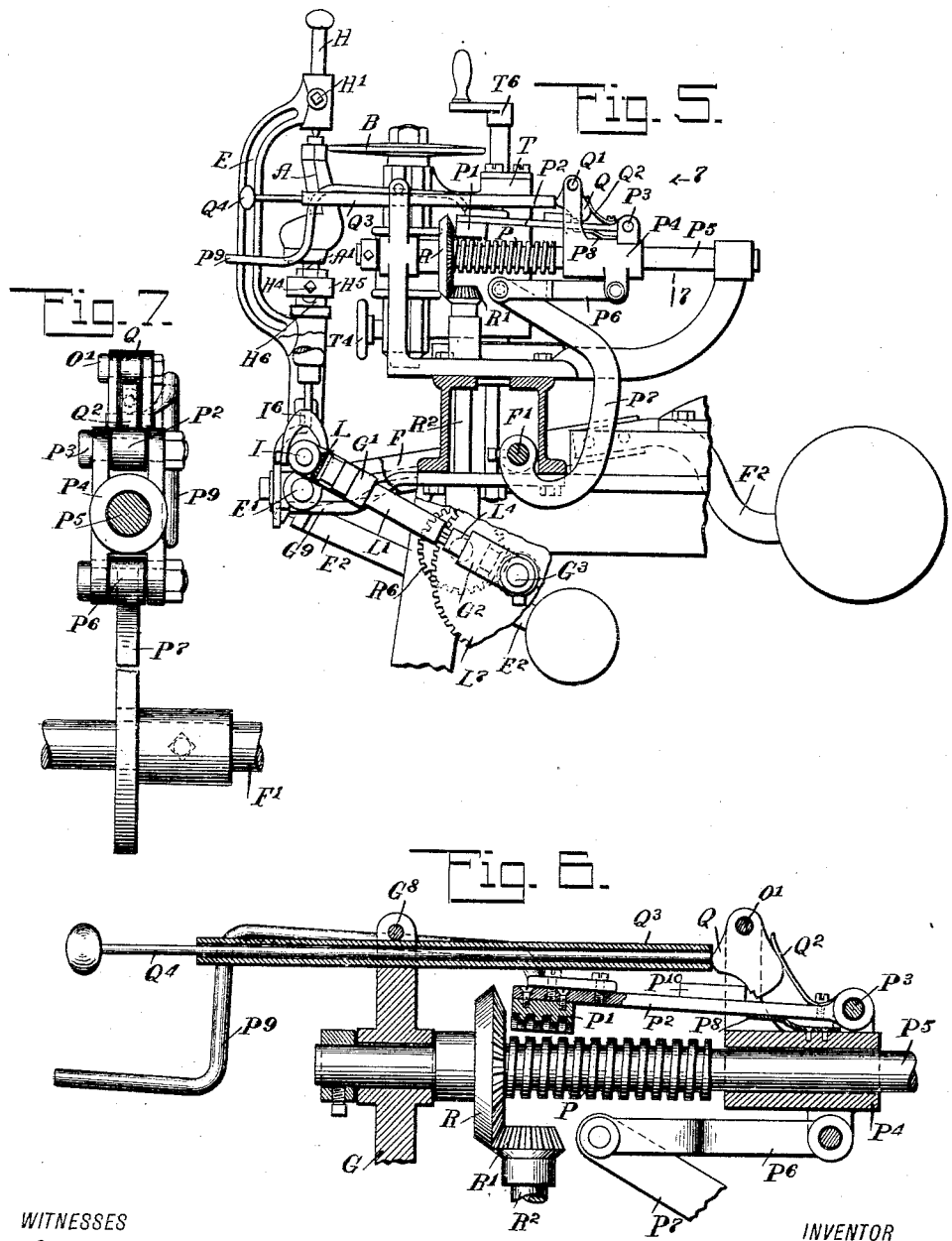

A. LEHMANN.
MACHINE FOR TURNING IRREGULAR FORMS.
APPLICATION FILED MAY 27, 1909.
963,594.
Patented July 5, 1910.
7 SHEETS—SHEET 7.
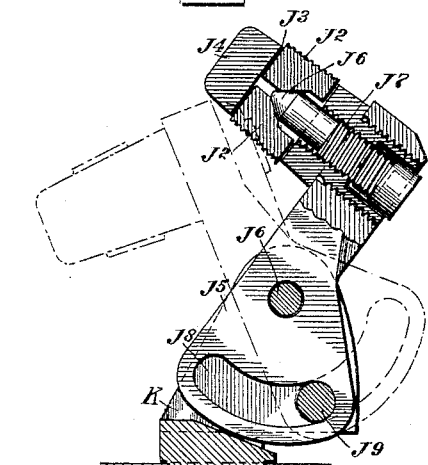
Fig. 11.
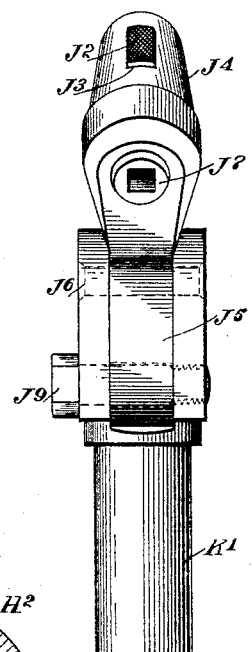
Fig. 12.
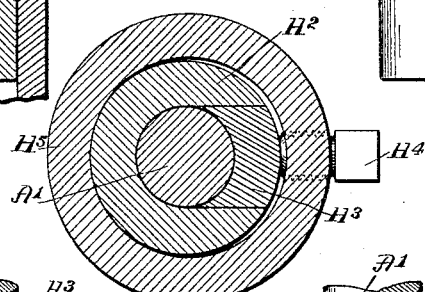
Fig. 15.
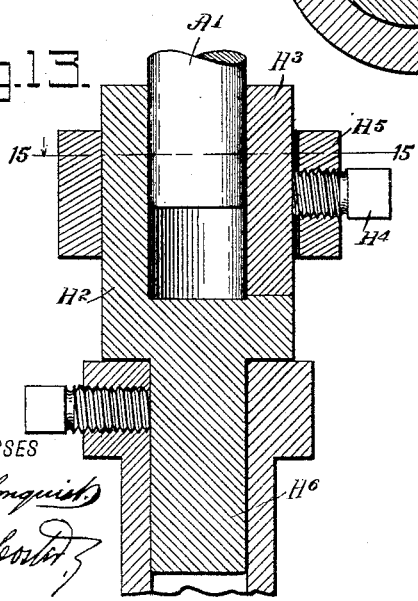
Fig. 13.
Fig. 14.
WITNESSES
L. Almquist
INVENTOR
Adolf Lehmann
BY
ATTORNEYS

UNITED STATES PATENT OFFICE.

ADOLF LEHMANN, OF NEW YORK, N. Y.

MACHINE FOR TURNING IRREGULAR FORMS.

963,594.  Specification of Letters Patent.  Patented July 5, 1910.

Application filed May 27, 1909. Serial No. 498,731.

*To all whom it may concern:*

Be it known that I, ADOLF LEHMANN, a citizen of the United States, and a resident of the city of New York, Evergreen, borough of Queens, in the county of Queens and State of New York, have invented a new and Improved Machine for Turning Irregular Forms, of which the following is a full, clear, and exact description.

The invention relates to machines for turning irregular forms such, for instance, as shown and described in the Letters Patent of the United States, No. 695,743, granted to me on March 18, 1902.

The object of the present invention is to provide a new and improved machine for simultaneously shaping a number of irregular forms, such as tobacco pipes and like articles, according to a predetermined model, the machine being arranged to automatically stop feeding at the time the work is finished, to allow convenient removal of the finished articles and replacing of the same by new work, thus permitting the shaping of a large number of articles accurately in a comparatively short time.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 8:
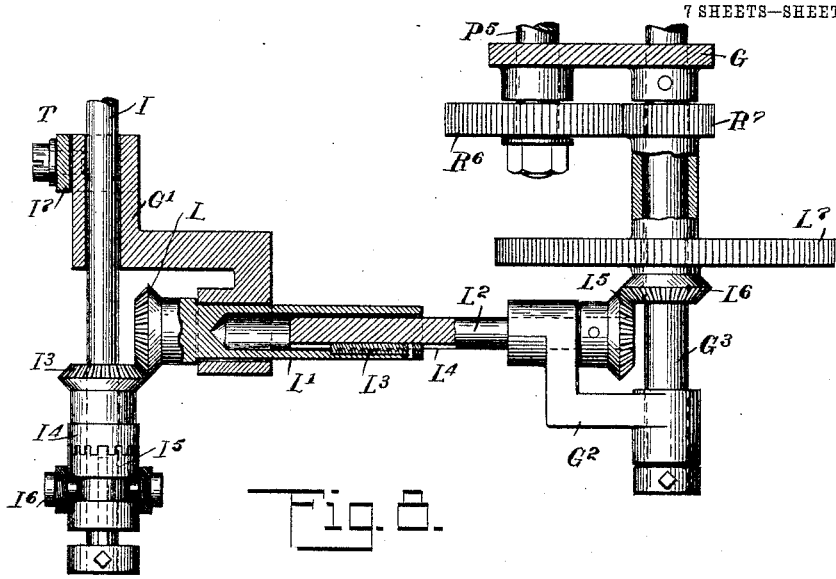
Figure 9:
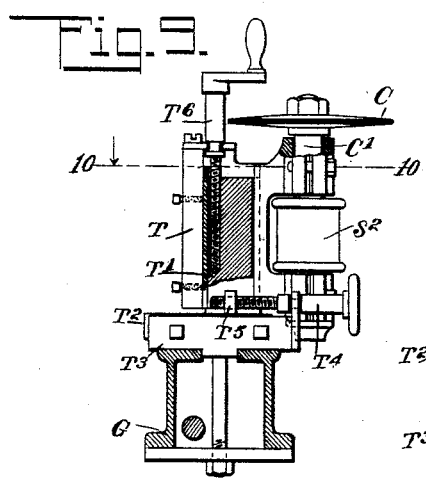
Figure 10:
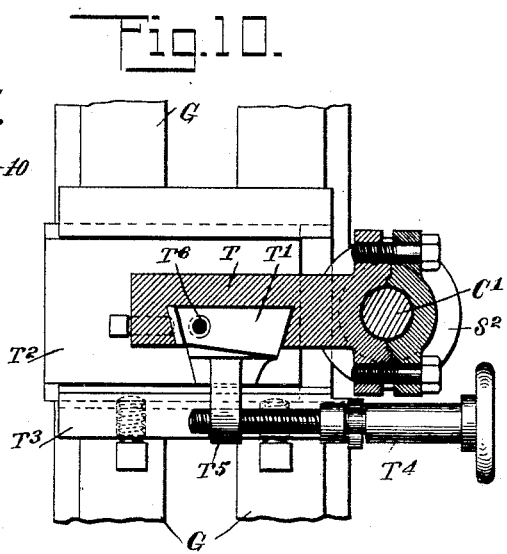

Figure 1 is a front elevation of the machine; Fig. 2 is an elevation of the right-hand end of the machine; Fig. 3 is a like view of the left-hand end of the machine; Fig. 4 is a plan view of the same; Fig. 5 is a cross section of the same on the line 5—5 of Fig. 4; Fig. 6 is an enlarged transverse section of part of the feed mechanism; Fig. 7 is a rear side elevation of the same, the feed screw being shown in section; Fig. 8 is an enlarged plan view with parts in section, of the driving mechanism for the work and model; Fig. 9 is a cross section of the adjusting means for the cutters and model disk; Fig. 10 is an enlarged sectional plan view of the same on the line 10—10 of Fig. 9; Fig. 11 is an enlarged cross section of the clamping head for holding the work; Fig. 12 is an enlarged front end elevation of the same; Fig. 13 is an enlarged sectional side elevation of the carrier for the model; Fig. 14 is a side elevation of the same; and Fig. 15 is a sectional plan view of the same on the line 15—15 of Fig. 13.

The machine, as illustrated in the drawings, is provided with a model or a pattern A, a model abutment B and two rotary cutters C, C, arranged on opposite sides of the abutment B for shaping two articles D at the time according to the model or pattern A, it being, however, understood that the machine may be provided with a large number of such rotary cutters to furnish a corresponding number of articles at the time.

The model A and the articles D, D are rotatably mounted on a swinging work frame E, having a longitudinally-extending rod $E^1$ journaled in the side arms F of a counterbalanced swinging frame, having a shaft $F^1$ journaled in suitable bearings arranged on the main frame G. On one end of the rod $E^1$ is secured a rearwardly-extending weighted arm $E^2$, to overbalance the work frame E and to cause the same to swing rearwardly, with a view to move the model A against the edge of the disk-shaped abutment B, and to move the work D, D against the revoluble cutters C, C, so that the latter cut the work according to the predetermined model or pattern A.

When the machine is running the side arms F, F of the feed frame are swung downward, thus causing the work frame E to move bodily in a like direction and thereby feed the model A and the work D, D in a vertical direction relative to the horizontally-disposed abutment B and the cutters C, C. The side arms F, F of the feed frame are provided with rearwardly-extending weighted arms $F^2$, to counterbalance the feed frame and the work frame E held thereon, and to allow the operator to conveniently move the said frame to an uppermost starting position, after the work D has been finished, it being understood that the feed frame is gradually and positively fed downward during the cutting operation by the action of a feed mechanism, hereinafter more fully described.

The model A, as shown in the drawings, simulates a tobacco pipe, is preferably made of metal and is engaged at the top by a center H, held vertically adjustable in the frame E, and secured in the adjusted position by a set screw $H^1$, and the lower end of the model A is provided with a shank $A^1$ in axial alinement with the center H and fitting into a socket $H^2$ (see Figs. 13, 14 and 15), having a portion of its wall forming a clamping jaw $H^3$, engaged by a set screw $H^4$ screwing in a ring $H^5$ surrounding the socket $H^2$. Now on screwing up the set screw $H^4$, the jaw $H^3$ is pressed inward into clamping contact with the shank $A^1$, to securely hold the model A in position, and when it is desired to remove the model A and exchange the same for one of different shape then the set screw $H^4$ is unscrewed to unclamp the shank $A^1$ and to allow removal of the model and replacing of the same by another one. The socket $H^2$ is formed or secured on the upper end of a spindle $H^6$, journaled in a suitable bearing arranged on the frame E, and on the lower end of the spindle $H^6$ is secured a bevel pinion $H^7$ in mesh with a bevel pinion $I^1$, secured on a shaft I, journaled in the work frame E, directly above and parallel with the rod $E^1$, as plainly indicated in Fig. 1.

The work D to be shaped in the form of a tobacco pipe by the cutters C, is engaged at its top by a center J, held vertically adjustable in the work frame E and adapted to be secured thereon by a set screw $J^1$, as plainly shown in Figs. 1, 2 and 3. The bowl $D^1$ of the work D is engaged at its inner surface by jaws $J^2$ mounted to slide in a transverse recess $J^3$ (see Figs. 11 and 12), formed in a stud $J^4$, attached to a swing arm $J^5$ fulcrumed at $J^6$ on a head K, provided with a stud $K^1$, secured in a hollow spindle $K^2$ by a set screw $K^3$, the said spindle $K^2$ being mounted to turn in the work frame E, and being provided at its lower end with a bevel pinion $K^4$ in mesh with a bevel pinion $I^2$, secured on a shaft I, so that when the latter is running a simultaneous rotary motion is given to the model A and the work D. The jaws $J^2$ are adapted to be moved outward in clamping contact with the inner surface of the bowl $D^1$ of the work D by the action of the conical end $J^6$ of a screw rod $J^7$, screwing in the stud $J^4$, so that when the stud $J^4$ is passed into the bowl $D^1$ and the screw rod $J^7$ is screwed up, then the jaws $J^2$ engage with their roughened or serrated faces the inner surface of the bowl $D^1$, thus fastening the bowl in position on the stud $J^4$. The swing arm $J^5$ is provided with a segmental slot $J^8$, through which passes a clamping screw $J^9$ held in the head K and securely holding the swing arm $J^5$ in any position into which it may be moved by the operator according to the angular position of the bowl $D^1$ relative to the stem of the pipe.

In order to impart a rotary motion to the work frame shaft I, the following driving gear is provided, special reference being had to Figs. 1, 2, 3, 4, 5 and 8. On the right-hand end of the work frame shaft I is loosely mounted a bevel pinion $I^3$, provided with a clutch member $I^4$, adapted to be engaged by a clutch member $I^5$, mounted to slide on and to turn with the shaft I. The clutch member $I^5$ is engaged by a shifting fork $I^6$ connected with a shifting lever $I^7$ fulcrumed on a bearing $G^1$ held loosely on the shaft I. The bevel pinion $I^3$ is in mesh with a bevel pinion L secured on the upper end of a connecting shaft made in sections $L^1$, $L^2$, of which the section $L^2$ telescopes in the tubular section $L^1$ and the latter is provided with a key $L^3$ engaging a key-way $L^4$ in the shaft section $L^2$. The shaft section $L^1$ is mounted to turn in the bearing $G^1$ and the section $L^2$ is mounted to turn in a bearing $G^2$ held loosely on a stud $G^3$, attached to the main frame G (see Fig. 8), and on the shaft section $L^2$ is secured a bevel pinion $L^5$ in mesh with a bevel pinion $L^6$ mounted to turn loosely on the stud $G^3$ and attached to a large gear wheel $L^7$ in mesh with a pinion N (see Fig. 2), mounted to turn on a stud $G^4$, adjustably attached to an arm $G^5$, fulcrumed loosely on the rod $F^1$ of the feed frame, the arm $G^5$ having a slotted extension $G^6$ engaged by a bolt $G^7$ screwing in the frame G. By the arrangement described, a pinion N, of larger or smaller diameter, can be mounted on the stud $G^4$ to change the speed of the gearing correspondingly. The pinion N is attached to a large gear wheel $N^1$ in mesh with a pinion $N^2$ mounted to rotate loosely on the rod $F^1$ and secured to a step pulley $N^3$, connected by a belt $N^4$ with a step pulley $N^5$ journaled on the frame G (see Fig. 2), and connected by a belt $N^7$ with a step pulley $N^8$ secured on the main driving shaft O, journaled in suitable bearings on the rear of the frame G. On the main driving shaft O are secured fast and loose pulleys $O^1$, $O^2$ (see Fig. 4), connected by a belt $O^3$ with other machinery, for imparting a rotary motion to the shaft O. The rotary motion of the shaft O is transmitted by the gearing described to the sectional connecting shafts $L^1$, $L^2$, to rotate the work frame shaft I at the time the clutch member $I^5$ is in mesh with the clutch member $I^4$. The rotary motion of the shaft I is transmitted by the pinions $I^1$, $H^7$ and $I^2$, $K^4$ to the spindles $H^6$, $K^2$, to rotate the model A and the work D in unison.

In order to impart motion in a downward direction to the feed frame and the work frame E carried thereon, the following arrangement is provided, special reference being had to Figs. 1, 2, 3, 4, 6, 7 and 8. A transverse feed screw P is journaled in suitable bearings arranged on the main frame G, and the said feed screw P is adapted to be engaged by a half nut $P^1$ attached to the free end of an arm $P^2$ fulcrumed at $P^3$ on a slide $P^4$, mounted to slide transversely on the non-threaded portion $P^5$ of the feed screw P. The slide $P^4$ is pivotally connected by a link $P^6$ with an arm $P^7$, secured on the rod $F^1$, so that when the half nut $P^1$ is in engagement with the rear end of the feed screw P and the latter is rotated then the half nut $P^1$ is moved forwardly and with it the slide $P^4$, so that the link $P^6$ and the arm $P^7$ turn the rod $F^1$ of the feed frame to swing the side arms F thereof in a downward direction, thus carrying the work frame E and the parts supported thereon in the same direction. The half nut $P^1$ is normally held out of engagement with the feed screw P by a spring $P^8$ secured to the slide $P^4$ and pressing the arm $P^2$ in an upward direction. When the arm $P^2$ is pressed downward by the operator bearing down on a handle $P^9$, then the half nut $P^1$ engages the feed screw P, and the arm $P^2$ is thus automatically locked in place by a catch Q fulcrumed at $Q^1$ on the slide $P^4$ and pressed on by a spring $Q^2$, the spring catch Q engaging a shoulder $P^{10}$ on the arm $P^2$. Now when the half nut $P^1$ about reaches the forward end of the feed screw P then the spring catch Q abuts against the rear end of a tubular stop $Q^3$, secured to the frame G, so that the spring catch Q is thrown out of engagement with the shoulder $P^{10}$, and the arm $P^2$ swings upward by the action of its spring $P^8$, so that the half nut $P^1$ disengages the feed screw P, as shown in Fig. 6. If it is desired to release the spring catch Q from the shoulder $P^{10}$ with a view to disengage the half nut $P^1$ from the feed screw P at any time during its travel from the rear end of the feed screw P toward the front end thereof, then use is made by the operator of a rod $Q^4$ sliding in the stop $Q^3$, to engage the spring catch Q and swing the same out of engagement with the shoulder $P^{10}$, thus releasing the arm $P^2$.

In order to turn the feed screw P, the following arrangement is made: On the feed screw P is secured a bevel gear wheel R in mesh with a bevel pinion $R^1$, secured on the upper end of the shaft $R^2$, journaled in suitable bearings arranged on the main frame G, and on the lower end of the shaft $R^2$ is secured a bevel gear wheel $R^3$ (see Fig. 1) in mesh with a bevel gear wheel $R^4$, attached to one end of a shaft $R^5$, extending longitudinally and journaled in suitable bearings on the main frame G. On the shaft $R^5$ is secured a spur wheel $R^6$ (see Figs. 1 and 8) in mesh with a pinion $R^7$, attached to the hub of the gear wheel $L^7$, so that when the latter is rotated, as previously explained, then a rotary motion is given by the pinion $R^7$ and the gear wheel $R^6$ to the shaft $R^5$, and the rotary motion of the latter is transmitted by the bevel gear wheels $R^4$, $R^3$ to the shaft $R^2$ which by the bevel pinion $R^1$ and the bevel gear wheel R rotates the feed shaft P.

The rod $Q^4$ and the handle $P^9$ extend to the front of the machine to be within convenient reach of the operator, and when the machine is started the operator lifts the feed frame into an uppermost position so that the bottom of the model A is at the edge of the model disk B and the half nut $P^1$ is at the rear end of the feed screw P. The operator now bears down on the handle $P^9$, so that the half nut $P^1$ engages the feed screw P and is locked in this position by the spring catch Q engaging the shoulder $P^{10}$. As the shaft $P^5$ rotates it moves the half nut $P^1$ forward and with it the slide $P^4$, so that the rod $F^1$ is gradually turned to swing the feed frame F downward and with it the work frame E. The cutters C now cut the work D, the shape of which is governed by the model A traveling on the edge of the model disk B. It is understood that the work frame E is pressed rearward by the action of the weighted arm $E^2$, so that the cutters C cut properly into the work D to shape the same according to the model A. When the model A in its descent has reached a lowermost position, that is, with the upper end opposite the edge of the model disk B, then the half nut $P^1$ is near the front end of the feed screw P, and at this time the spring catch Q abuts against the stop $Q^3$, to release the arm $P^2$, so that the spring $P^8$ swings the arm $P^2$ upward and disengages the half nut $P^1$ from the feed screw P. The downward feeding of the feed frame F and the work frame E now ceases and the operator can remove the finished articles and replace the same by new work, after which the above-described operation is repeated, that is, the frames F and E are swung into uppermost positions and the half nut $P^1$ is reëngaged with the rear end of the feed screw P.

The tubular stop $Q^3$ is adjustably secured in a split bearing on the frame G and secured therein by a clamping screw $G^8$ (see Fig. 6), to allow of releasing the half nut $P^1$ from the feed screw P, according to the height of the work to be finished at the time. The downward motion of the feed frame F and the work frame E is limited by a stop $G^9$, secured to the frame G and adapted to be engaged by the shaft $E^1$.

The model disk B and the cutters C, C are rotated from the main shaft O, and for this purpose the main shaft O is provided with pulleys S (see Fig. 4), over which pass belts $S^1$ also passing over pulleys $S^2$ on the spindles $B^1$, $C^1$, $C^1$ of the disk B and the cutters C, C, respectively.

The model disk B and the cutters C, C are mounted for vertical and transverse adjustment, to allow of adjusting the model disk B and the cutters C, C to the same relative position one to the other and to the model A and the work D. The adjusting mechanisms for the model disk B and the cutters C, C are alike in construction, so that it suffices to describe but one in detail, special reference being had to Figs. 9 and 10. Each of the spindles $B^1$, $C^1$ is journaled in a bearing T, mounted to slide up and down on a post $T^1$, erected on a slide $T^2$, mounted to slide transversely in guideways $T^3$, attached to the frame G. On the guideways $T^3$ is mounted to turn an adjusting screw $T^4$, screwing in a nut $T^5$, projecting from the post $T^1$, so that when the adjusting screw $T^4$ is turned by the operator the slide $T^2$ and with it the post $T^1$ and the bearing T are moved in a transverse direction. In the top of the bearing T is journaled a vertical adjusting screw $T^6$, screwing in the post $T^1$, so that when the operator turns this adjusting screw $T^6$ the bearing T is raised or lowered according to the direction in which the adjusting screw $T^6$ is turned. Thus from the foregoing it will be seen that by the arrangement described the model disk B and the cutters C can be raised or lowered or moved forward or backward, to bring the same in the desired relative positions previously mentioned.

The operation is as follows: When the main shaft O is driven, a continuous rotary motion is given to the model disk B, the cutters C, C, the feed screw P and the sectional shaft $L^1$, $L^2$, but the shaft I, the model A and the work D are not rotated unless the clutch member $I^5$ is moved into mesh with the clutch member $I^4$ on the loose pinion $I^3$, so that the pinion L on the sectional shaft $L^1$, $L^2$ rotates the pinion $I^3$ and by the clutch member $I^5$ shaft I. Now when the clutch member $I^5$ is out of mesh with the clutch member $I^4$ the pinion $I^3$ simply runs loose on the shaft I and the latter is not rotated. The operator can now swing the work frame E forwardly for conveniently placing a model A and the blocks of wood or other work D, D in position on the model and work carriers, mounted on the work frame E, as shown and above explained, and then the operator swings the feed frame F into its uppermost position and releases the work frame E, to allow the latter to swing rearwardly into operative position. It is understood that when the feed frame F is raised by the operator, the rod $F^1$, arm $P^7$ and link $P^6$ draw the slide $P^4$, the arm $P^2$ and the half nut $P^1$ rearward, so that the operator on now pressing the handle $P^9$ swings the arm $P^2$ downward, thus moving the half nut $P^1$ into engagement with the rear end of the revolving feed screw P, to swing the feed frame F and the work frame E downward. The operator now also moves the shifting lever $I^7$, to throw the clutch member $I^5$ into engagement with the clutch member $I^4$ of the pinion $I^3$, so that the shaft I is rotated and a rotary motion is given to the model A and to the work D, D. The cutters C, C now cut the work to the shape of the model A, and when this is done the half nut $P^1$ is automatically thrown out of engagement with the feed screw P, so that the downward movement of the feed frame F and the rock frame E ceases. The operator now moves the shifting lever $I^7$ to disengage the clutch members $I^4$, $I^5$, to stop the rotation of the shaft I, the model A and the finished work. The operator now swings the work frame E forward, removes the finished work and replaces the same by blocks of wood or other work, and then returns the frames F and E to operative positions, as previously explained, and manipulates the handle $P^9$ and the shifting lever $I^7$, to start the feeding of the frames F and E in a downward direction and to rotate the model A and the work D, D, as before explained.

From the foregoing it will be seen that the attendant in charge of the machine only periodically operates the handle $P^9$ and the shifting lever $I^7$, and removes the finished work and replaces the same by new work, but the actual shaping of the articles is completely automatic and requires no attention on the part of the attendant.

Having thus described my invention I claim as new and desire to secure by Letters Patent:

1. A machine for turning irregular forms, comprising a revoluble cutter, a revoluble model abutment, a swinging feed frame, a swinging work frame pivoted at one end to the end of the feed frame to swing transversely, and adapted to be moved bodily up and down by the movement of the feed frame, the swinging work frame having revoluble means for carrying and rotating the work to be engaged by the said cutter, and a revoluble model mounted on the said swinging work frame for contact with the said model abutment.

2. A machine for turning irregular forms by revoluble cutters provided with a swinging work frame having revoluble work-carrying means, a counterbalancing swinging feed frame having a swinging movement toward and from the cutters, the said work frame being journaled at one end in the end of the feed frame and carried by the movement of the feed frame past the cutters, and a counterbalance for the said work frame to swing the same toward the cutters.

3. A machine for turning irregular forms by revoluble cutters, provided with a swinging work frame having revoluble work-carrying means, a counterbalancing swinging feed frame having a swinging movement toward and from the cutters, the said work frame being journaled at one end in the end of the feed frame and adapted to be carried by the movement of the feed frame past the cutters, a counterbalance for the said work frame to swing the same toward the cutters, a work-driving shaft journaled on the said work frame for driving the said work-carrying means, a revoluble model mounted on the said work frame and driven from the said shaft, and a model abutment for the said model to abut against.

4. A machine for turning irregular forms, comprising a revoluble cutter, a model abutment, a swinging work frame carrying a revoluble model for engagement with the said abutment, the swinging work frame having revoluble work-carrying means, a swinging feed frame having a swinging movement toward and from the said cutter and model abutment, the said work frame being journaled at one end in the end of the feed frame and carried by the movement of the feed frame past the cutter and abutment, and an overbalancing means connected with the said swinging work frame, to swing the latter inward for the work to engage the said cutter and the model to engage the said abutment.

5. A machine for turning irregular forms, comprising a swinging work frame, a counterbalancing swinging feed frame, the said work frame being journaled at one end in the end of the feed frame, an overbalancing weight for the said work frame, a model, revoluble model-carrying means on the said work frame, revoluble work-carrying means on the said work frame, revoluble cutters for engagement by the work, and a revoluble model abutment for engagement by the said model, the said work frame being moved past the cutters and the said abutment by the movement of the feed frame.

6. A machine for turning irregular forms, comprising a swinging work frame provided with means for rotatably carrying the work and a model, a counterbalancing swinging feed frame, the said work frame being journaled at its lower end in the end of the feed frame and moved up and down by the movement of said feed frame, and a feed mechanism for imparting movement to the said feed frame.

7. A machine for turning irregular forms, comprising a swinging work frame having a revoluble carrier for carrying the work, a counterbalancing swinging feed frame, the said work frame being journaled at its lower end in the end of the feed frame and moved up and down thereby, a feed mechanism connected with the said feed frame for imparting a swinging motion thereto, and a counterweight for the said work frame to impart a swinging motion to the same independently of the said feed frame.

8. In a machine for turning irregular forms by revoluble cutters, a feed frame mounted to swing, a swinging work frame pivoted at its lower end to the end of the feed frame, a revoluble work carrier mounted on the work frame, the said work frame being pivoted to swing transversely and adapted to carry the work toward or from the cutters, and a feed mechanism connected with the feed frame for imparting a swinging motion thereto to feed the said work frame bodily downward in the direction of the height of the work.

9. A machine for turning irregular forms, comprising a swinging work frame, a revoluble work carrier mounted on the said work frame and adapted to carry the work, a revoluble model carrier mounted on the said work frame and carrying a model, a counterbalancing swinging feed frame, the work frame being pivoted at one end to one end of the swinging feed frame, a revoluble feed screw, a half nut for engagement with the said feed screw, a spring-pressed arm carrying the said half nut, a slide on which the said arm is mounted, and a connection between the said slide and the said feed frame to swing the latter positively in one direction.

10. A machine for turning irregular forms, comprising a swinging work frame, a revoluble work carrier mounted on the said work frame and adapted to carry the work, a revoluble model carrier mounted on the said work frame and carrying a model, a counterbalancing swinging feed frame, the work frame being pivoted at one end to the end of the swinging feed frame, a revoluble feed screw, a half nut for engagement with the said feed screw, a spring-pressed arm carrying the said half nut, a slide on which the said arm is mounted, a connection between the said slide and the said feed frame to swing the latter positively in one direction, a shaft journaled in the said work frame and geared with the said work and the said model carriers, a main driving shaft, and self-adjusting means connecting the said main driving shaft with the said work frame shaft.

11. A machine for turning irregular forms, comprising a swinging work frame, a revoluble work carrier mounted on the said work frame and adapted to carry the work, a revoluble model carrier mounted on the said work frame and carrying a model, a counterbalancing swinging feed frame, the work frame being pivoted at one end to the end of the feed frame, a revoluble feed screw, a half nut for engagement with the said feed screw, a spring-pressed arm carrying the said half nut, a slide on which the said arm is mounted, a connection between the said slide and the said feed frame to swing the latter positively in one direction, a spring catch on the said slide for engagement with the said half nut arm, and a stop for the said catch to throw the latter out of locking engagement with the said half nut arm.

12. A machine for turning irregular forms, comprising a swinging work frame, a revoluble work carrier mounted on the said work frame and adapted to carry the work, a revoluble model carrier mounted on the said work frame and carrying a model, a counterbalancing swinging feed frame, the work frame being pivoted at one end to the end of the feed frame, a revoluble feed screw, a half nut for engagement with the said feed screw, a spring-pressed arm carrying the said half nut, a slide on which the said arm is mounted, a connection between the said slide and the said feed frame to swing the latter positively in one direction, a spring catch on the said slide for engagement with the said half nut arm, a tubular fixed stop for engagement by the said catch to throw the latter out of locking engagement with the said half nut arm, and a manually-controlled stop slidable in the tubular stop for actuating the said catch.

13. A machine for turning irregular forms, comprising a swinging work frame, a revoluble work carrier mounted on the said work frame and adapted to carry the work, a revoluble model carrier mounted on the said work frame and carrying a model, a counterbalancing swinging feed frame, the work frame being pivoted at one end to the end of the swinging feed frame, a revoluble feed screw, a half nut for engagement with the said feed screw, a spring-pressed arm carrying the said half nut, a slide on which the said arm is mounted, a connection between the said slide and the said feed frame to swing the latter positively in one direction, a shaft journaled in the said work frame and geared with the said work and the said model carriers, a main driving shaft and self-adjusting means connecting the said main driving shaft with the said work frame shaft, and a gearing connecting the said main driving shaft with the said feed screw.

14. A machine for turning irregular forms provided with a swinging work frame having revoluble carriers for carrying the work, a feed frame mounted to swing, the work frame being pivoted at one end to the end of the feed frame, a driven feed screw, a half nut for engagement with the said feed screw, a slide carrying the said half nut, and a connection between the said slide and the said feed frame to swing the latter to feed the work frame axially of the work.

15. A machine for turning irregular forms, comprising a main frame, a revoluble cutter mounted thereon, a counterbalancing swinging feed frame journaled in the main frame below the cutter to swing up and down, a work frame having a revoluble carrier for the work and extending in front of the cutter, the work frame being journaled at its lower end in the front end of the feed frame to swing toward and from the cutter, the said work frame being moved vertically by the movement of the feed frame to move the work past the cutter, a weight connected with the work frame to swing the same rearwardly toward the cutter, and means for swinging the feed frame to cause the work frame to move bodily in a downward direction to feed the work to the cutter.

16. A machine for turning irregular forms, comprising a main frame, a horizontally disposed revoluble cutter and a horizontally disposed revoluble model abutment mounted on the main frame, a counterbalancing feed frame having a shaft journaled in the main frame below the cutter and abutment, the feed frame being mounted to swing up and down, a work frame carrying the work and a model, and extending in front of the cutter and model abutment, the work frame being journaled at its lower end in the front end of the feed frame to swing thereon toward and from the cutter and abutment, the said work frame being moved vertically by the movement of the feed frame, a weight connected with the work frame to swing the same rearwardly toward the cutter and abutment, and a feed mechanism for swinging the feed frame to cause the work frame to move bodily in a downward direction to feed the work and the model in a vertical direction relative to the cutter and the abutment.

17. A machine for turning irregular forms, comprising a cutter, a swinging work frame for carrying the work and a model, a counterbalancing swinging feed frame, the said work frame being journaled at its lower end in the end of the feed frame and adapted to swing toward and from the cutter, the said work frame being moved up and down by the movement of said feed frame to carry the work past the edge of the cutter, and a feed mechanism for imparting movement to the said feed frame.

18. A machine for turning irregular forms, comprising a cutter, a swinging work frame, a counterbalancing swinging feed frame, the work frame being journaled at one end in the end of the feed frame, and moved up and down by the movement of said feed frame to carry the work past the cutter, a feed mechanism connected with the said feed frame for imparting a swinging motion thereto, and a counterweight for the said work frame to impart a swinging motion to the same toward the cutter independently of the said feed frame.

19. A machine for turning irregular forms, comprising horizontally disposed revoluble cutters, a feed frame mounted to swing, a swinging work frame pivoted at one end to one end of the feed frame and adapted to carry the work toward or from the cutters, and a feed mechanism connected with the feed frame for imparting a swinging motion thereto to move the said work frame bodily downward to feed the work in a vertical direction relative to the said cutters.

In testimony whereof I have signed my name to this specification in the presence of two subscribing witnesses.

ADOLF LEHMANN.

Witnesses:
   THEO. G. HOSTER,
   PHILIP D. ROLLHAUS.